Sept. 7, 1965 D. HUGHES 3,204,352
TRACTOR ATTACHMENT WITH PARALLELOGRAM TYPE LIFT
Filed Sept. 28, 1962 3 Sheets-Sheet 1
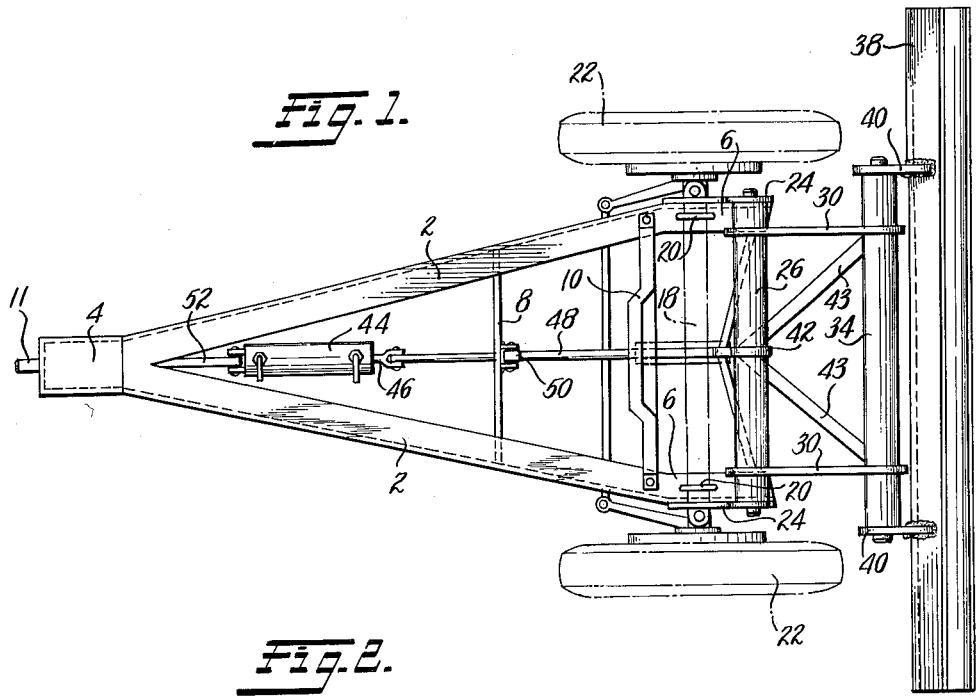
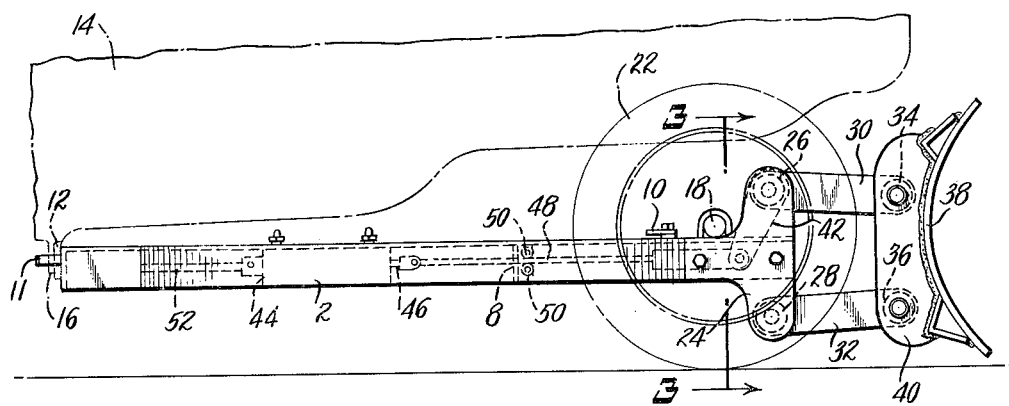
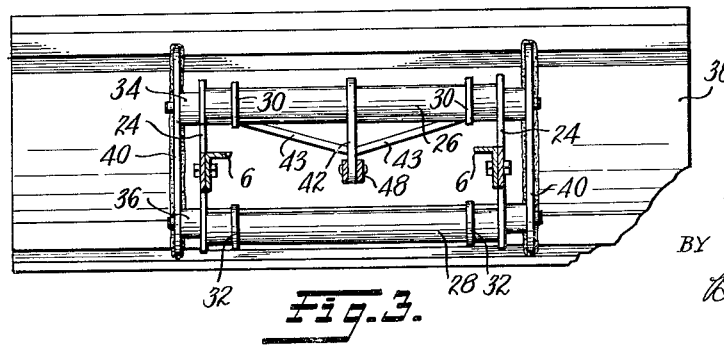
INVENTOR
Dean Hughes
BY
Bacon & Thomas
ATTORNEYS

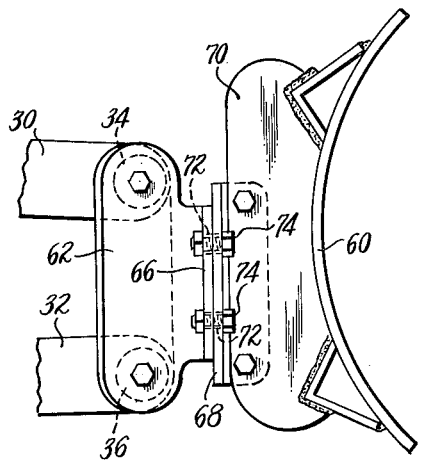
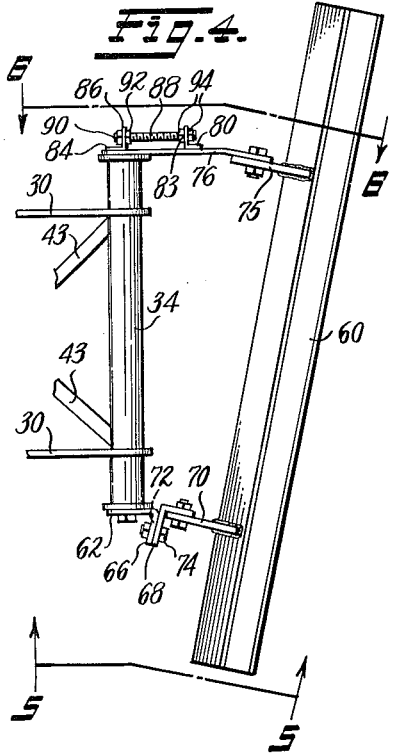
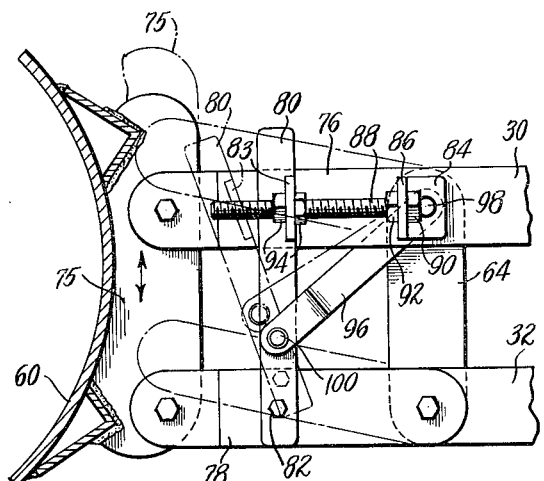

INVENTOR
Dean Hughes

BY Bacon & Thomas
ATTORNEYS

United States Patent Office 3,204,352
Patented Sept. 7, 1965

1

3,204,352
TRACTOR ATTACHMENT WITH PARALLELO-
GRAM TYPE LIFT
Dean Hughes, 1918 N. Springfield, Anthony, Kans.
Filed Sept. 28, 1962, Ser. No. 226,979
2 Claims. (Cl. 37—144)

This invention relates to attachments for tractors or the like whereby bulldozer blades, snow plows or other implements be removably attached to a tractor and thereafter removed therefrom.

The present invention constitutes an improvement of the invention disclosed in the M. Parker et al. Patent No. 2,742,720.

In general, the invention comprises a frame adapted to be removably attached to a tractor so that the frame extends forwardly under the front axle. The frame terminates in front of the tractor axle but rearwardly of the front edge of the steerable tractor wheels whereby to permit full range steering of the tractor. The invention also contemplates novel means for attaching a bulldozer blade or the like to the frame whereby one side may be selectively raised or lowered to tilt the blade.

It is, therefore, an object of this invention to provide an implement attachment for a tractor providing for greater range of steering movement of the tractor wheels than heretofore provided by similar attachments.

Another object is to provide an attachment as set forth above including novel means for effecting vertical adjustment of one side of an implement.

Still another object is to provide an attachment as set forth wherein novel means are provided for effecting raising or lowering of the implement.

A further object is to provide an attachment of the type set forth which is simple and economical to produce yet highly efficient and reliable in operation.

Further and additional objects and advantages will become apparent to those skilled in the art as the description proceeds with reference to the accompanying drawings wherein:

FIG. 1 is a top plan view of one embodiment of the present invention with portions of a tractor shown in phantom lines;

FIG. 2 is a side elevational view of FIG. 1;

FIG. 3 is a vertical sectional view taken substantially along the line 3—3 of FIG. 2;

FIG. 4 is a fragmentary plan view of a further embodiment of an attachment according to the present invention;

FIG. 5 is a fragmentary end view of FIG. 4 as seen from the line 5—5;

FIG. 6 is a vertical sectional view taken along the line 6—6 of FIG. 4;

Figure 7:
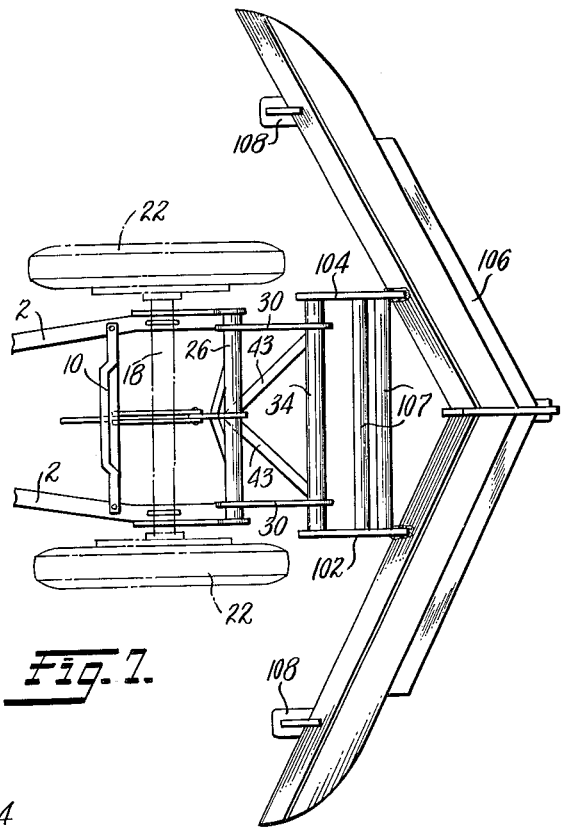
FIG. 7 is a top plan view of an attachment according to the present invention whereby a snow plow is attached to the tractor.

Referring first to FIGS. 1 and 2, the attachment comprises a flat framework having side members 2 which converge rearwardly and are joined as at 4. At their forwards ends, the members 2 are bent to extend forwardly parallel to each other as at 6. Suitable cross members 8 and 10 are provided to strengthen and rigidify the frame and to hold portions 6 in the desired spaced relationship. At its rearmost end, the frame is provided with a pin 11 adapted to be received in an opening in lug 12 on the bottom of tractor 14 and which by means of a pin 16 or the like removably secures the rear end of the frame to the tractor.

The frame is so dimensioned and proportioned that the parallel front portions 6 extend below the front axle 18 of the tractor 14 and to which they are removably secured

2 by U-bolts 20 or the like. It is to be noted that the frame portions 6 extend forwardly only a relatively short distance past the axle 18 and terminate a substantial distance short of the front edge portions of the steerable wheels 22 of the tractor. At their foremost ends, the frame members 2 are provided with generally vertical T-shaped plates 24, best shown in FIG. 2. A pair of horizontal cross-shafts 26 and 28 extend between the respectively upper and lower ends of the plates 24 and are journaled in the plates 24. Each of the shafts 26 and 28 has a pair of forwardly extending links 30 and 32 rigidly secured thereto so as to swing in a vertical plane as their respective shafts are rotated. It is to be noted that the links 30 and 32 are secured to the shafts 26 and 28 inwardly from the ends therof and a susbtantial distance inwardly from the outermost edges of the frame portions 6 thus providing a clearance space forwardly of the frame members to accommodate the front portions of the steerable wheels 22 when the latter are turned in either direction in steering movement. It will be apparent that the arrangement thus described provides for substantially complete and full range steering of the tractor while the attachment is in place and yet provides for widely separated points of attachment between the frame and tractor to provide great stability and strength.

In the form shown in FIGS. 1 through 3, the forward ends of the links 30 and 32 carry cross-shafts 34 and 36, the ends of which extend laterally beyond the links 30 and 32. An implement, for example the bulldozer blade 38, is provided with rearwardly extending spaced plates 40, welded thereto and extending rearwardly therefrom. Each of the plates 40 is of substantial vertical extent and is provided with a pair of bearings or the like to reecive the ends of shafts 34 and 36. Thus, the bulldozer blade is suspended from the attachment for vertical movement by a generally parallelogram linkage.

One of the shafts 26 or 28 (in this instance, shaft 26) is provided with a downwardly extending radial arm 42 rigidly fixed to the shaft 26 at its mid portion and braces 43 extend from the arm 42 to the shaft 26, as shown. A hydraulic motor 44 in the form of a piston and cylinder is mounted on the frame described and its piston connecting rod 46 is pivotally joined to the rear end of an actuating rod 48 which extends forwardly therefrom into pivotal engagement with the lowermost end of the radial arm 42. The actuating rod 48 may be supported and guided from cross member 8 by means of upper and lower guide rollers 50. The guide rollers 50 serve to hold the hydraulic motor 44 in generally horizontal position since its rearmost end is shown as pivoted to frame member 52. It will be obvious that actuation of the hydraulic motor 44 will enforce pivotal movement of shaft 26 in one direction or the other and to a controllable extent whereby the elevation of bulldozer blade 38 may be controlled.

Plates 40 were described as being spaced apart to engage the ends of the shafts 34 and 36. As was described, the ends of shafts 34 and 36 extend laterally beyond the links 30 and 32. Thus, the bulldozer blade is supported at widely spaced points for additional strength and stability while the links 30 and 32 are much closer together to provide for full-range steering of the tractor as already described.

In the form shown in FIGS. 4 through 6, an implement, such as the bulldozer blade 60 is supported on a tractor attachment identical to that described in connection with FIGS. 1 through 3, through an intermediate structure to be described. In FIGS. 4 through 6, the links 30 and 32 may be the same links as described in connection with the earlier figures. In this embodiment, however, the shafts 34 and 36 extending between the forward ends of the links 30 and 32 are not connected directly to the bulldozer blade but are provided with vertical joining members 62 and 64 in which they are journalled. Thus, the shafts 34 and 36 and members 62 and 64 define what may be termed an upright frame secured to the front ends of the pairs of links 30 and 32. The upright member 62 is provided with an outwardly-directed flange 66 which is in sliding abutment with a flange 68 secured to a vertical plate 70 welded or otherwise rigidly fastened to the bulldozer blade 60. The flanges 66 and 68 are provided with opposed horizontally elongated slots 72 through which bolts 74 extend. Thus, by loosening the bolts 74 the bulldozer blade may be tilted about a horoizontal axis extending perpendicular to the flanges 66 and 68 which in turn is an axis extending generally fore and aft of the implement generally through the flanges 66 and 68. The elongated horizontal slots 72 provide for such relative movement and may be tightened to lock the flanges in a selected position of adjustment.

The other end of the bulldozer blade 60 is provided with an upright plate 75. Upper and lower arms 76 and 78 are journalled on the ends of shafts 34 and 36 and extend forwardly into pivotal supporting engagement with the plate 75. Thus, one end of the bulldozer blade 60 is supported from the links 30 and 32 by a parallelogram linkage whereby it may be raised or lowered and the other end of the blade is supported for generally pivotal movement about a horizontal fore and aft axis, as described.

As shown in FIG. 6, an uprght lever 80 is pivoted at 82 to the lowermost arm 78 intermediate the ends of the latter and extends upwardly therefrom past upper arm 76. The lever 80 is provided with a laterally extending flange 83 having an opening therethrough. Outwardly of the upper arm 76 a right angle bracket 84 is pivotally mounted on the end of shaft 34 and is provided with a lateral flange 86 also having an opening therethrough. A threaded rod or bolt 88 extends through the openings in flanges 83 and 86. One end of the bolt 88 is provided with a head 90 on one side of flange 86 and a nut 92 on the other side of that flange. Lock nuts 94 are provided on the bolt 88 on opposite sides of the flange 83 whereby adjustment of the nuts 94 along bolt 88 will result in swinging lever 80 in vertical plane parallel to the arms 76 and 78.

A connecting link 96 is pivotally mounted on the same pivot 98 which supports bracket 84 and extends downwardly and forwardly to the lever 80 to which it is pivoted at 100, spaced upwardly from the pivot 82. Thus, it will be seen that the swinging adjustments of the lever 80 in a forward or rearward direction will result in forcibly adjusting the arms 76 and 78 to a different angular position in a vertical plane and thus effect raising or lowering of the adjacent end of bulldozer blade 60. The dotted line showing of FIG. 6 illustrates the relative positions of the parts when the blade is adjusted to a higher position than that shown by full lines.

Figure 8:
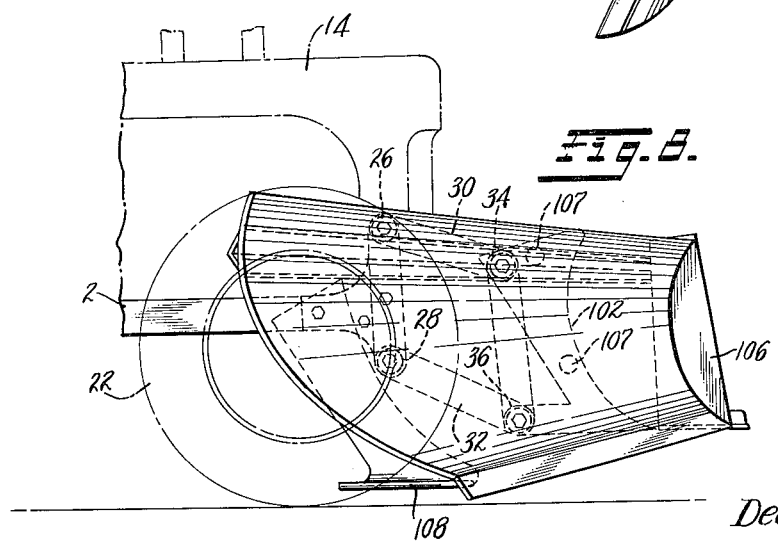
FIG. 8 is a side view of the structure shown in FIG. 7.

FIGS. 7 and 8 are merely illustrative of the manner in which a snow plow or the like may be mounted to a tractor by means of the attachment previously described. In this embodiment the shafts 34 and 36 are journalled to vertical plates 102 and 104 which are welded or otherwise secured to the rear face of the snow plow 106 in essentially the same manner as is the bulldozer blade shown in FIG. 1. In view of the shape of the snow plow, however, the plates 102 and 104 must extend rearwardly a substantial distance, necessitating the provision of strengthening or stiffening braces 107. The snow plow is provided with shoes 108 adapted to slidably support the plow from the ground or other surface.

While a limited number of specific embodiments of the invention have been shown and described herein, it is to be understood that the same are merely illustrative of the principles of the invention, which may be embodied in other forms falling within the scope of the appended claims.

I claim:

1. In combination with a tractor having a front axle with steerable wheels thereon; a frame removably secured to said tractor and having a pair of side members extending forwardly under said front axle spaced inwardly of said wheels; a vertical support plate secured to the front end of each side member and each plate being a distance rearwardly of the front edges of said front wheels greater than their distance forwardly from said front axle; horizontal upper and lower rear shafts journalled in said plates; upper and lower forwardly extending links secured to said shafts spaced a substantial distance inwardly of said plates and side members whereby to provide clearance for steering movement of said front wheels; and an implement pivotally mounted on the forward ends of said links, an upright framework pivotally connected to the forward ends of said links; means connecting one portion of said implement to one lateral end of said framework for pivotal adjustment about a horizontal axis extending generally fore-and-aft of said implement; and means connecting another portion of said implement to the other end of said framework for vertical adjustment thereon whereby one end of said implement may be raised or lowered, said last-named means comprising an upper and a lower arm each pivoted to said framework at said other end thereof and extending forwardly therefrom into pivotal engagement with said other portion of said implement; and adjusting means for pivotally adjusting said arms in a vertical plane and locking them in a selected position of adjustment.

2. The combination defined in claim 1 wherein said adjusting means comprises; an upright adjusting lever pivoted at its lower end to an intermediate portion of the lower one of said arms; a connecting link pivoted to an intermediate portion of said lever and to said framework adjacent the pivotal connection thereto of the upper one of said arms; and threaded means for swinging said lever about its lower pivot and locking the same in a selected position.

References Cited by the Examiner

UNITED STATES PATENTS

| 1,918,771 | 7/33 | Meyer | 37—42 |
| 2,228,490 | 1/41 | Smith | 172—276 |
| 2,565,337 | 8/51 | Allan | 37—144 |
| 2,742,720 | 4/56 | Parker | 37—144 |
| 2,765,721 | 10/56 | Smith | 37—153 |

FOREIGN PATENTS

| 151,112 | 4/53 | Australia. |
| 859,483 | 12/52 | Germany. |
| 741,608 | 12/55 | Great Britain. |

T. GRAHAM CRAVER, *Primary Examiner.*

MILTON KAUFMAN, ARNOLD RUEGG, *Examiners.*